Dec. 3, 1946.  T. K. SHERWOOD  2,412,014
MANUFACTURE OF FORMALDEHYDE
Filed Nov. 19, 1943  2 Sheets-Sheet 1

INVENTOR.
Thomas K.
Sherwood.
BY

Patented Dec. 3, 1946

2,412,014

UNITED STATES PATENT OFFICE 2,412,014

MANUFACTURE OF FORMALDEHYDE

Thomas K. Sherwood, Wellesley, Mass., assignor to Godfrey L. Cabot, Inc., Boston, Mass., a corporation of Massachusetts Application November 19, 1943, Serial No. 510,898

6 Claims. (Cl. 260—604)

This invention consists in improvements in processes of producing formaldehyde from natural gas. It has been known for many years that methane may be converted into formaldehyde by mixing natural gas with nitrogen oxides as a gaseous catalyzer and heating, thus inducing an oxidizing reaction in the mixture resulting in the formation of formaldehyde. Processes of this character as heretofore carried out have not been entirely satisfactory for large scale production and have been carried out only under conditions of high pressure with poor efficiency in respect both to time and materials used. The present invention consists in improvements by which the output of formaldehyde may be greatly increased as compared to the output of previous processes, the efficiency of the manufacturing process greatly increased in respect to the use of gas and catalyzers, and the time for completing the process substantially reduced as compared to the time formerly required. Moreover, the process of my invention may be advantageously carried out in apparatus of compact design at atmospheric pressure and in a continuous manner of operation.

Heretofore it has been considered necessary to employ an air-gas mixture containing a large excess of air, for example, to five parts of air one part of methane. In accordance with my novel process however, we require a much smaller proportion of air, and may employ about equal parts of air and methane or 30 to 50 parts methane with 70 to 50 parts air. From this striking difference in procedure flow several extremely important advantages. In the first place, the less air used the higher the yield of formaldehyde per volume treated and per volume of methane. This advantage results partly from the fact that when a larger proportion of air is used in the process a very appreciable amount of methane is necessarily burned up and wasted. In the second place, the smaller volume of air used results in less dilution of the product than heretofore, so that recovery is more complete and cheaper. In the third place, the reaction rate is faster and the process therefore is more efficient in respect to time than heretofore. Finally, since the dilution of the gas is less, I come out with a more combustible waste gas mixture and this may be utilized as an efficient fuel for heating the reactors.

Heretofore a minimum temperature of about 1000° F. has been employed for inducing the desired oxidizing reaction, whereas I find that improved results are attained by employing decidedly higher temperature, for example at least 1200° F.

As a result of the rich air-gas mixture I employ and the increased working temperature, I find that the process may be very appreciably speeded up. For example, in processes heretofore practiced a contact time of about 8 seconds for reacting the methane has been considered necessary, whereas the contact time of my novel process is in the order of ¼ to ½ second.

Another extremely important advantage of my improved process is that the amount of catalyzer employed may be very substantially reduced. For example, heretofore it has been considered necessary to employ $NO_2$ in amounts between 4.5 and 9 lbs. per 1000 cu. ft. of methane. I have discovered that in practicing my process I require only about .29 lb. of $NO_2$ per 1000 cu. ft. of methane. I am thus able to reduce by more than one-half the amount of the most expensive item required in carrying out my process.

A characteristic feature of the process of my invention comprises the step of cooling the vaporized formaldehyde as it leaves the reactor by direct contact with a formaldehyde solution. Formaldehyde will decompose rapidly at the temperatures at which the gases must leave the reactor station. If the yield of formaldehyde is to be appreciable, therefore, it is necessary to cool the gases very rapidly. The rate of heat transfer between a hot gas and a solid surface is relatively slow, and it is well known in engineering practice that the rapid cooling of large quantities of hot gases by the use of ordinary heat transfer apparatus involves very large surfaces and correspondingly expensive equipment. The formaldehyde decomposes so rapidly at the elevated temperatures that a cooler is not practical if a metal wall is interposed between the cooling medium and the gas.

It is not uncommon to quench the hot gases by the use of water sprays. Such procedure has two principal advantages: (1) the provision of a large area of contact between the gas and the cooling medium, and (2) the maintenance of a maximum temperature (the boiling point of the water) of the cooling medium. However, if the gas contains a constituent soluble in water and if this constituent is present in small amounts relative to the total heat carried by the gas, then the amount of water needed will be large and the resulting solution objectionably dilute. This is the problem to be solved in the present instance for, since the desired product is a relatively concentrated solution, the use of water would lead to considerable added expense for concentration. Actually the gas contains both water and formaldehyde, and the condensate naturally formed on a cold surface would be a fairly strong solution, for example, as high as 19%. Consequently, the use of a solution approximating the concentration of the condensible portion of the gas results in a product which requires no greater expense for concentration than if the condensate were formed directly on a cold surface. In practice, a slightly more dilute solution may be employed since the cold gas carries more water vapor than the hot gases leaving the reactor.

By the spray-cooling step of my novel process the solution picks up the heat and this heat must be removed in the liquid cooler. Heat exchangers for this purpose are standard equipment items and relatively cheap. Therefore, the advantage of the spray-cooling step of my process is that it makes possible the substitution of a simple and cheap spray cooler plus a standard-design liquid cooler in place of an expensive gas cooler which is impractical for formaldehyde treatment. The use of the formaldehyde solution corresponding to the condensate concentration makes it possible to do this without adding to the process the cost of concentrating an aqueous solution.

The process of my invention will be best understood and appreciated by first considering the accompanying diagrammatic flow sheet of apparatus which may be advantageously employed in carrying out my novel process, although it will be understood that the process is not restricted to this or to any specific type of apparatus.

Figure 1:
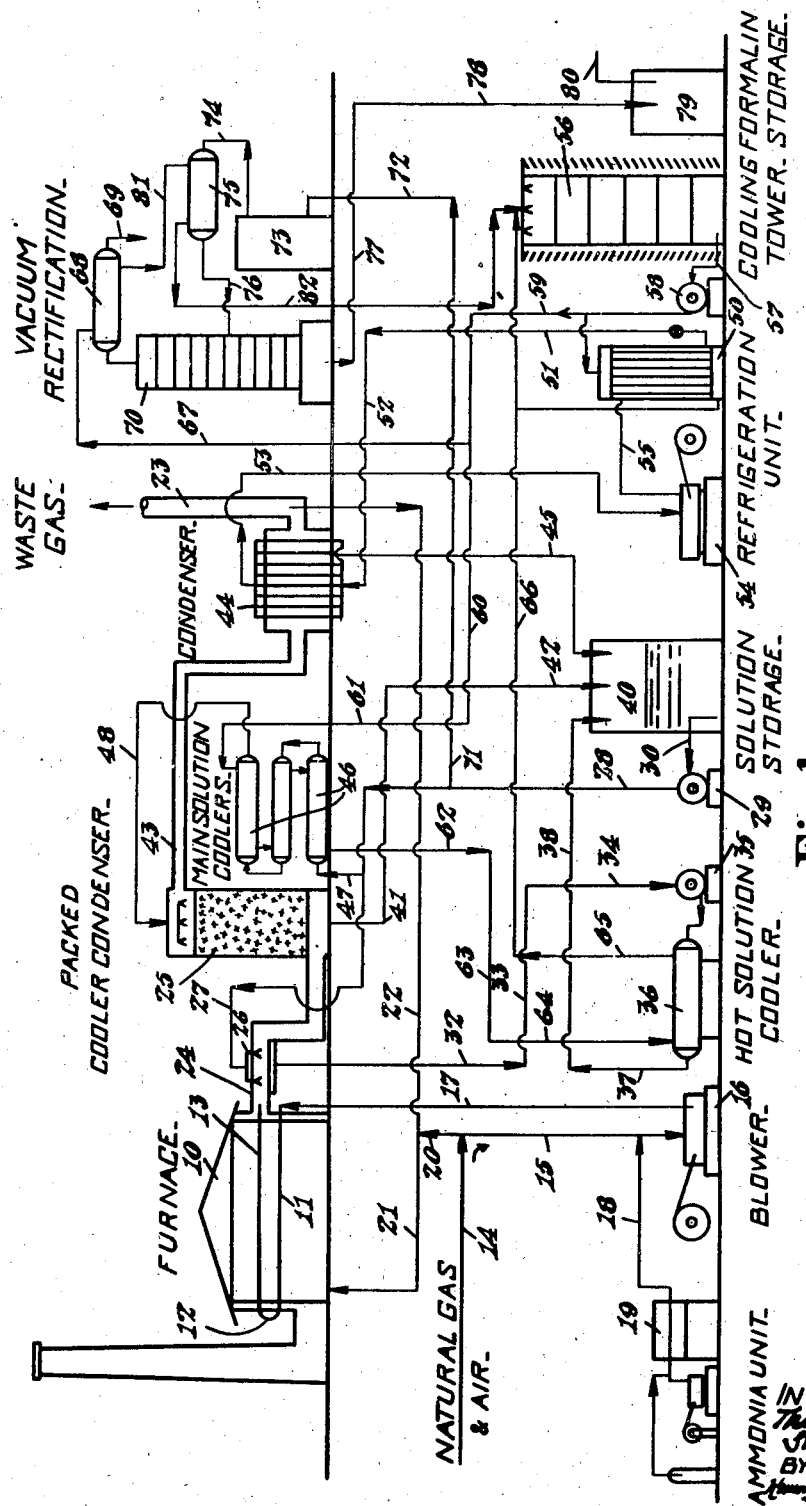
Fig. 1 is a diagrammatic flow sheet.

The flow sheet of Fig. 1 illustrates one suitable form of apparatus arranged compactly for carrying out the process of my invention in a continuous manner. A furnace 10 is shown on the left hand side of the assembly and this contains a series of horizontal two-pass reactors, only one appearing in Fig. 1. Each reactor may comprise a lower tube 11 of alloy steel connected outside the furnace wall by a metal U-bend 12 to an upper horizontal tube 13 of silica. Natural gas and air mixed in the proper proportions are delivered to the apparatus through a horizontal supply pipe 14, the mixture being led downwardly through a vertical pipe 15 to a blower 16 and forced by the blower through a vertical pipe 17 to the right hand end of the tube 11. Oxides of nitrogen are introduced into the vertical pipe 15 from a catalytic ammonia combustion unit 19 through a horizontal pipe 18. The vapor of nitrogen oxides is thus drawn into the blower, forced by it into the air-gas mixture and then in a turbulent current through the tubes of the reactor.

In the apparatus herein shown the furnace is heated by natural gas fuel and the supply pipe 14 is shown as connected to a fuel inlet pipe 21 through a connection 20. To this gaseous fuel may be added waste gas, uncondensed in its progress through the apparatus, taken from the waste gas stack 23 through the horizontal pipe 22 which leads directly to the fuel inlet pipe 21. The furnace is regulated preferably so that the steel tube of the reactor is heated to approximately 900° F. and the silica tube 13 to about 1200° F. These conditions have been found particularly favorable since contact of the mixture with SiO$_2$ of the silica tube tends to retard oxidation of the formaldehyde which is formed in the reaction.

The gaseous products of the reaction are delivered from the silica tubes 13 of the reactors through a manifold, not shown, into an outlet duct 24 in which they are immediately cooled by a spray of cool formaldehyde solution of approximately 19.2% concentration supplied by a spray head 26. The prompt occurrence of this step after the formation of the formaldehyde vapor eliminates any substantial decomposition of the formaldehyde which would otherwise rapidly occur at the temperatures at which the vapor must leave the reactor. The spray head is connected through a pipe 27 and a vertical pipe 28 to a pump 29, which draws the cool formaldehyde solution from a storage tank 40, the pump having an inlet connection 30 with the tank 40. The spray head 26 has return connections 32, 33, 34 to a second pump 35 by which the formaldehyde solution, heated by contact with the vaporized product in its spraying operation, is delivered to a hot solution cooler 36 and then forced from the cooler through a vertical pipe 37 and the horizontal pipe 38 to the storage tank 40.

The outlet duct 24 leads from the reactor manifold to the bottom of a packed cooler condenser tower 25. That portion of the vaporized product not condensed by the formaldehyde spray from the spray head 26 now passes upwardly through the condenser 25. Formaldehyde solution condensed in its progress through the condenser 25 is drawn off through pipe connections 41—42 and delivered to the storage tank 40. That part of the vaporized product not condensed in the condenser 25 passes into an outlet duct 43 which leads from the top of the condenser and is carried through a refrigerated condenser 44. Formaldehyde solution condensed from this vapor passes down through the vertical pipe 45 and back to the storage tank 40, while gases still uncondensed are discharged through the waste gas stack 23 or are drawn from this stack through the connection 22 for fuel.

A portion of the formaldehyde solution pumped upwardly through the pipe 28 on its way to the spray head 26 is deflected by a connection 47 and conducted through a series of tubular coolers 46 passing from these through the outlet pipe 48 which leads back to the top of the condenser tower 25. The cooled formaldehyde solution passes downwardly through the condenser 25 in counter-flow relation to the ascending vaporized product.

An ammonia refrigeration unit 50 is provided for the purpose of supplying a refrigerating medium to the condenser 44. Liquified ammonia gas passes upwardly from the vertical pipe 51 and the horizontal pipe 52 to the condenser 44, and expanding into the condenser, is returned through the vertical pipe 53 to the compressor 54. It is drawn from the compressor 54 through the horizontal pipe 55, to the unit 50.

Cooling water for the refrigeration unit is drawn from a cooling tower 56 through an outlet pipe 57 and forced by a circulating pump 58 upwardly through the vertical pipe 59, horizontal pipe 60 and the vertical pipe 61, to the main solution coolers 46. It is discharged from these coolers through the pipes 62, 63, 64, and delivered to the hot solution cooler 36. It leaves the hot solution cooler through the vertical pipe 65 and is returned through the horizontal pipe 66 through the top of the cooling tower. Cooling water is also taken from the horizontal pipe 60 through the vertical pipe 67 to a condenser 68 connected to the top of a rectifying column 70, while the spent cooling water is discharged from the cooler 68 by the connection 82.

Formaldehyde which has been collected from the quenching station at the furnace and the two condensers 25 and 44 in the storage tank 40 at a concentration of about 19.2% by weight is now to be concentrated to the 38% formalin solution required in commerce. The solution withdrawn from the storage tank 40 contains up to 1.5% formic acid and a small amount of acetaldehyde. The former should be removed or neutralized before concentration in order to reduce corrosion in the concentration equipment and to produce an acceptable formalin product. Accordingly the 19.2% solution withdrawn from the storage tank 40 and pumped through the vertical pipe 28 is drawn from this pipe by a horizontal pipe 71 and conducted through the vertical pipe 72 to a boiler 73 where the formaldehyde solution may be boiled with caustic, for example, 100 to 200 lbs. of caustic to 2000 gals. of formalin solution, and then passed through a connecting pipe 74 to a condenser 75. From the condenser it is delivered by a pipe 76 to approximately the center of the rectification column 70. The formalin solution is collected from the bottom of the column and delivered by connecting pipes 77 and 78 to a formalin storage tank 79. From there it may be pumped through a delivery pipe 80 as required. Instead of wasting the spent water from the condenser 68 by the connection 81 this water may be passed through the connection 81 to the condenser 75 and returned from there through the vertical pipe 82 to the cooling tower 56.

Figure 2:
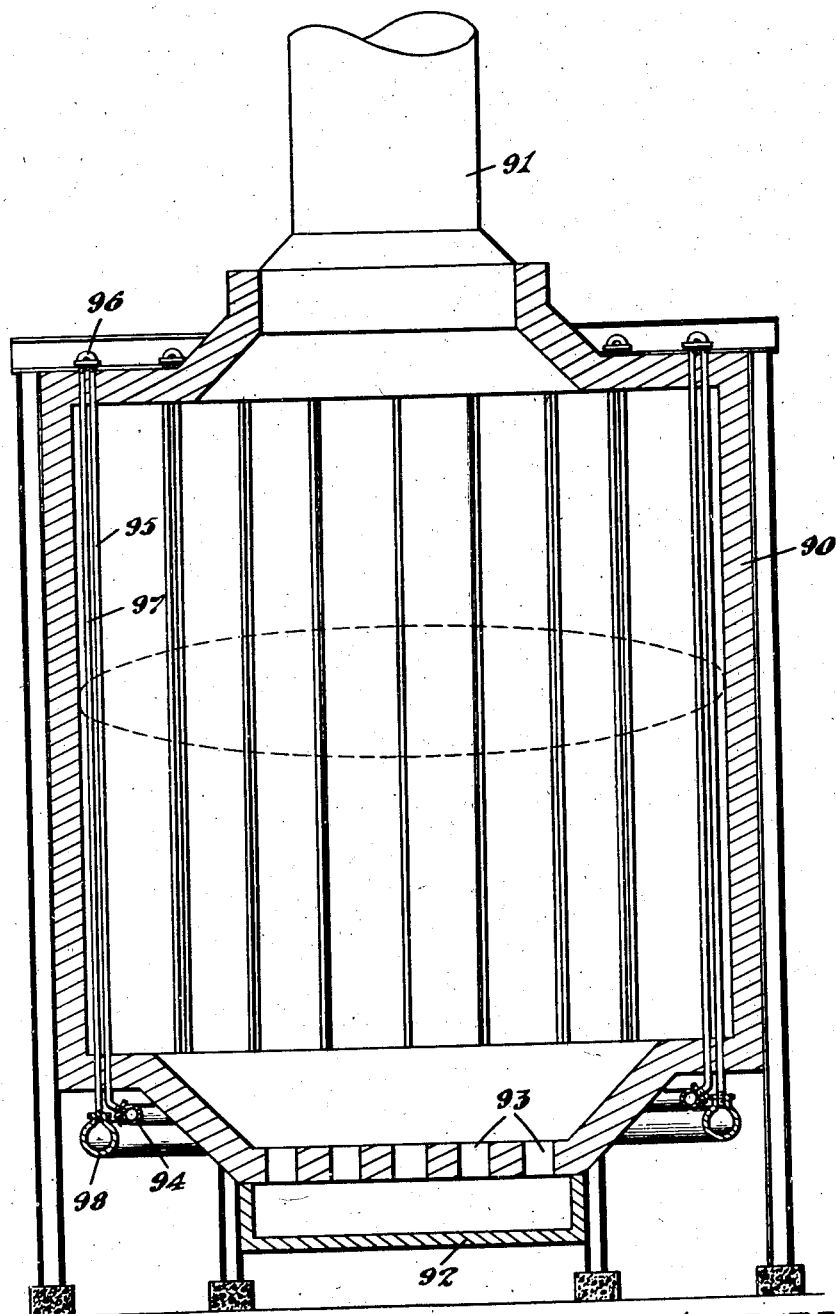
Fig. 2 is a diagrammatic view in vertical section and in some detail of a furnace having tubes arranged in vertical position rather than horizontal as in the conventional showing in Fig. 1.

An alternative form of furnace of the vertical type suitable for carrying out the process of our invention is shown in Fig. 2. This comprises a circular refractory body 90 having an outlet stack 91 for the products of combustion. Gaseous fuel is conducted to the bottom of the furnace through a duct 92 and delivered to its interior through burner openings 93. The entire interior of the furnace is ringed with a double bank of vertical tubes. The tubes 95 of the inner series are of alloy steel and are connected outside the top of the furnace by metal U-bends to the tubes 97 of the outer series. These are preferably of silica as already explained in connection with the furnace of Fig. 1. The air-gas-NO₂ mixture is supplied to the tubes 95 through an annular gas inlet manifold 94 which is located outside and below the body of the furnace. The gases delivered from the manifold 94 pass upwardly through the tubes 95 where they may be heated to a temperature approaching 900° F. for example, and then pass downwardly to the tubes 97 where they are heated to a temperature of approximately 1200° F. Reacted vaporized product is delivered to an annular outlet manifold 98 and thence conducted to a station at which the quenching operation is effected by a spray of cool formaldehyde solution as outlined in the explanation of the flow sheet of Fig. 1 or the quenching step may be carried out directly in the manifold 98.

It will be noted that the apparatus above described is designed to be operated at atmospheric pressure. This is a characteristic and very important feature of the process of my invention and one that distinguishes it from processes heretofore attempted which have invariably required high operating pressure and the presence of solid catalysts.

The silica tubes and their employment in the process disclosed are not herein claimed but constitute the subject-matter of the co-pending application of Raymond P. Rossman, Ser. No. 509,733, filed November 10, 1943.

Having thus disclosed my invention and described an illustrative example thereof, I claim as new and desire to secure by Letters Patent:

1. The process of making formaldehyde from natural gas which includes the steps of heating a mixture of methane and air with NO₂ to a temperature above 1100° F., and then immediately and before any substantial decomposition can take place, cooling the vaporized product by direct contact with a cool formaldehyde solution.

2. The process of making formaldehyde from natural gas which includes the steps of mixing methane, air and NO₂, heating the mixture above 1100° F., then immediately and before any substantial decomposition can take place, condensing a portion of the vaporized product by direct contact with a cool formaldehyde solution, and subsequently cooling the uncondensed vapor and thereby securing a further condensation of formaldehyde.

3. The process of making formaldehyde from natural gas which includes the steps of mixing natural gas and air in approximately equal proportions, adding a nitrogen oxide as a gaseous catalyzer, subjecting the mixture to a temperature of approximately 1200° F. for an interval not longer than one second, and then rapidly cooling and condensing the vaporized product.

4. The process of making formaldehyde from natural gas which includes the steps of mixing 3 to 5 parts natural gas with 7 to 5 parts air and not over 2% NO₂ by volume based on total natural gas, air, and NO₂, passing the mixture through a reactor at an emerging temperature of about 1200° F., and immediately condensing a portion of the vaporized product by direct contact with a spray of cool formaldehyde solution thereby substantially eliminating decomposition of the formaldehyde which would otherwise occur at the temperature at which the vaporized product issues from the reactor.

5. The process of making formaldehyde from natural gas which includes the steps of mixing natural gas with air in substantially equal proportions, adding not over 2% NO₂ by volume based on total natural gas, air, and NO₂, passing the mixture through a reactor at approximately 1200° F., immediately condensing the vaporized product by direct contact with cool formaldehyde solution thereby eliminating decomposition of the formaldehyde which would otherwise occur at the temperature at which the vaporized product issues from the reactor, and then concentrating the solution by vacuum rectification.

6. The process of making formaldehyde from natural gas which includes the steps of mixing methane, air and NO₂, heating the gas mixture above 1100° F., and then condensing the vaporized gas mixture by direct and immediate contact with a formaldehyde solution of substantially the same concentration as that resulting from the condensation of the reacted gas mixture, and thereby eliminating decomposition of the reacted mixture which would otherwise occur at temperatures approximating 1100° F.

THOMAS K. SHERWOOD.